March 1, 1966     W. E. FERRELL     3,237,412
RESERVOIR LOCATER
Filed Sept. 23, 1964
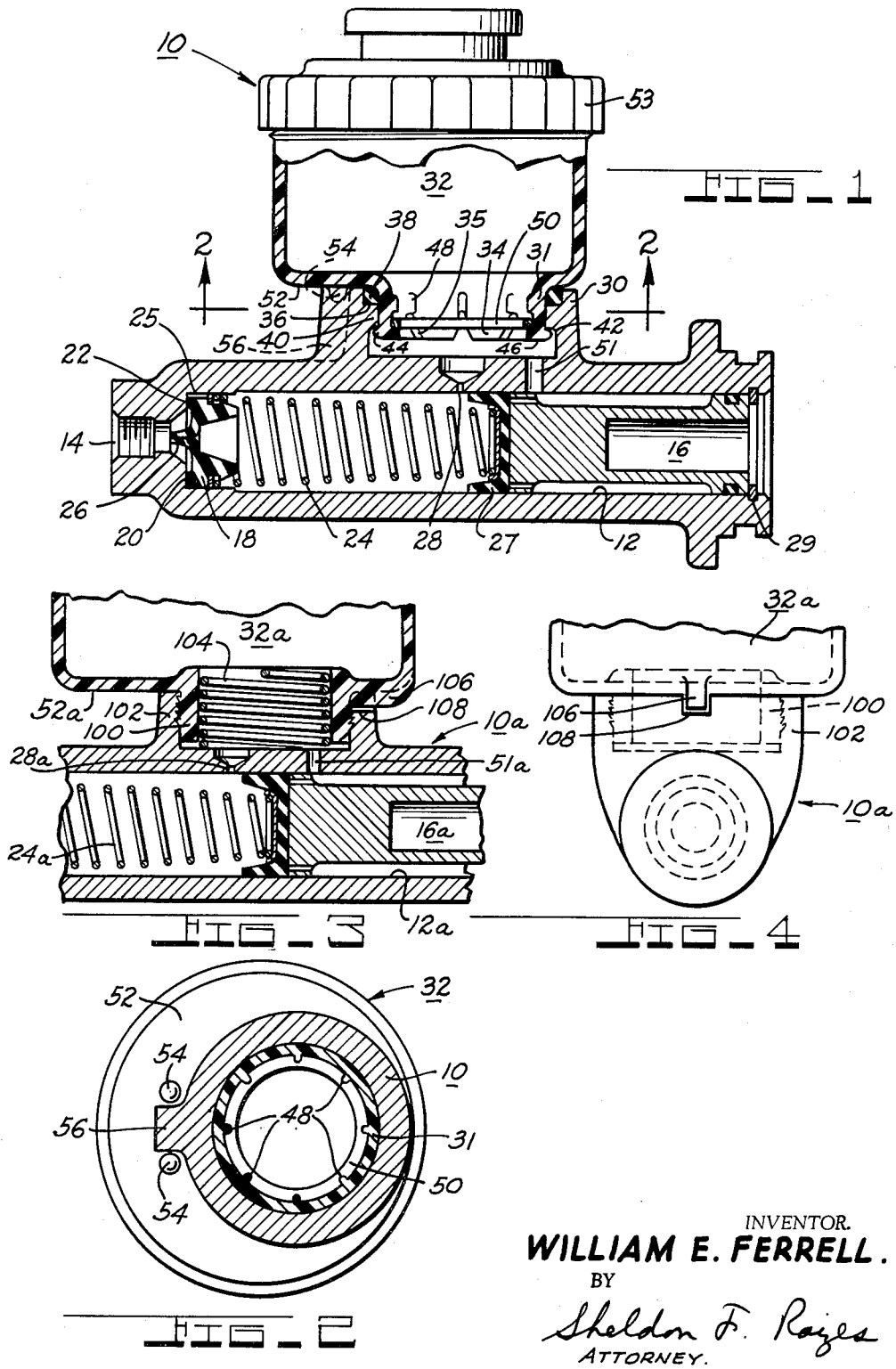
INVENTOR.
WILLIAM E. FERRELL.
BY
Sheldon F. Raiger
ATTORNEY.

United States Patent Office 3,237,412
Patented Mar. 1, 1966

3,237,412
RESERVOIR LOCATER
William E. Ferrell, St. Joseph, Mich., assignor to The Bendix Corporation, St. Joseph, Mich., a corporation of Delaware
Filed Sept. 23, 1964, Ser. No. 398,518
10 Claims. (Cl. 60—54.6)

This invention relates to a master cylinder reservoir and master cylinder body connection.

More particular, this invention has as one of its objects the provision of means for preventing rotation of the master cylinder reservoir relative to the master cylinder body when the construction for connecting the reservoir to the cylinder body is insufficient to prevent rotation of the reservoir.

Another object of the invention is to utilize the means for preventing rotation of the reservoir on the master cylinder body for locating the reservoir on the cylinder body.

Other objects of the invention will become apparent from the following description with reference to the drawings wherein:

FIGURE 1 is a sectional view of a master cylinder body and reservoir assembly;
FIGURE 2 is a view taken along section line 2—2 of FIGURE 1;
FIGURE 3 is a modification of FIGURE 1; and
FIGURE 4 is an end view of FIGURE 3.

Referring to FIGURE 1, there is illustrated a master cylinder casting 10 comprising a bore 12 having a fluid outlet port 14 at one end thereof and a slidable actuating piston 16 therein at the other end thereof. A residual pressure valve 18 is also located in the bore and has an annular surface 20 biased against an annular seat 22 by a spring 24 and permits fluid displaced by the piston 16 to flow between a split and lip 26 during actuation of the master cylinder and upon the return stroke of the piston 16 is unseated against the force of the spring 24 to permit return fluid to pass through openings 25 in the outer peripheral edge of the valve member 18. A lip seal 27 is provided on the advanced end of the piston 16 for closing off a compensating port 28 during actuation of the master cylinder. The spring 24 is compressed between the seal and the valve member 18 to hold the seal in engagement with the piston and to return the piston to its normal position against a stationary snap ring 29, in addition to seating the valve member 18.

A female annular boss 30 is integral with the casting 10 and receives therein an annular male boss 31 of a fluid reservoir 32. The reservoir may be of any suitable material through plastic is preferred and illustrated. The male boss 31 comprises a plurality of flexible fingers 34 separated by slots 35 opening onto the lower edge thereof. The upper inner surface of the flange 30 has an annular shoulder 36 for receiving an O-ring 38 thereon and also has an annular rib 40 having a tapered undersurface 42. Each finger 34 has a tapered lip 44 projecting from the lower outer surface thereof, which in its unflexed state is of a greater outer diameter than the inner diameter of the annular rib 40. When the male boss 31 is inserted into the female boss 30, the fingers are compressed towards one another, due to engagement of the tapered part of the lips 44 with the rib 40, and then expand when the lips 44 pass the rib to engage the tapered undersurface 42 of the rib 40 thereby securing the reservoir to the casting 10. A lip 46 also projects from the lower inner surface of each finger 34 and a nib 48 projects inwardly from the closed end of each slot 35. A snap ring 50 is located between the inner lip 46 and the nibs 48 and applies an expanding force on the fingers to expand the same into engagement with the annular rib 40 to provide an additional force for securing the reservoir to the casting. The nibs 48 maintain the snap ring 50 in the correct location and also facilitate assembling the snap ring since the person assemblying the same will know that once the snap ring is beyond the nibs it is properly seated. The undersurface 52 of the reservoir seats on the top edge of the flange 30 and the distance between the undersurface 52 and the lips 44 is such that the O-ring 38 is compressed upon assembly to prevent leakage of fluid therepast. The compensating port 28 and a replenishing port 51 communicate the reservoir to the bore 12.

The force exerted on the fingers by the snap ring is not strong enough to prevent rotation of the reservoir about its axis relative to the casting when, for instance, a rotational effort is required to loosen or tighten a reservoir cap 53. In order to prevent rotation of the reservoir, the reservoir is provided with a pair of beads 54 which straddle a rib 56 projecting outwards from the boss 30. The space between the beads 54 is slightly larger than the width of the rib 56 to allow for tolerances and therefore the reservoir will be able to rotate only slightly until one of the beads engages the rib 56. The reservoir 32 is eccentric about the axis of the boss 31 and therefore the beads and rib not only prevent substantial rotation of the reservoir 32 relative to the casting 10, but also serves as a locator for the reservoir on the casting.

Referring to FIGURES 3 and 4, there is illustrated another embodiment of the invention. Those elements which are the same as the previous elements are given the same reference numerals with an "a" affixed thereto.

The reservoir 32a has a male boss 100 which extends into a female boss 102 on the casting 10a. The outer surface of the wall of the male boss is pressed into the toothed inner surface of the female boss by a radial expansion spring 104. A rib 106 extends downwards from the bottom surface 52a of the reservoir and is received in a groove 108 in the boss wall 102 for both locating the eccentric reservoir and for preventing rotation thereof relative to the casting 10a.

While the invention has been described in considerable detail, I do not wish to be limited to the particular constructions shown and described and it is my intention to cover hereby all equivalent constructions which come within the scope of the following claims.

I claim:

1. A master cylinder comprising: a body member having a longitudinal bore with fluid actuating means therein, a reservoir member which is generally perpendicular to the axis of said bore, means securing said reservoir member to said body member, said securing means allowing substantial rotation of said reservoir relative to said body member about an axis generally perpendicular to said bore axis, a portion projecting from one of said members and fixed thereto at a predetermined location, a pair of spaced abutment means fixed to the other of said members at a predetermined location receiving said projecting portion therebetween for engagement therewith, and projecting portion and abutments being arranged relative to each other circumferentially about said perpendicular axis to prevent substantial rotation of said reservoir.

2. The structure as recited in claim 1 wherein said reservoir is eccentric about said axis which is generally perpendicular to said bore axis.

3. A master cylinder comprising: a body member having a longitudinal bore with fluid actuating means therein, a reservoir member having a bottom surface which is generally parallel to the axis of said bore, means securing said reservoir member to said body member, said securing means allowing substantial rotation of said reservoir relative to said body member about an axis generally perpendicular to said bore axis, a portion fixed to and projecting downwards from said bottom surface, a pair of spaced abutment means fixed to said body member at a predetermined location and receiving said projecting portion therebetween for engagement therewith to prevent substantial rotation of said reservoir.

4. The structure as recited in claim 3 wherein said reservoir is eccentric about said axis which is generally perpendicular to said bore axis.

5. A master cylinder comprising: a body member having a longitudinal bore with fluid actuating means therein, reservoir member having a bottom surface which is generally parallel to the axis of said bore, means securing said reservoir member to said body member, said securing means allowing substantial rotation of said reservoir relative to said body member about an axis generally perpendicular to said bore axis, a portion fixed to and projecting from said body member at a predetermined location, a pair of spaced abutment means fixed to and projecting downwards from said bottom surface receiving said projecting portion therebetween for engagement therewith to prevent substantial rotation of said reservoir.

6. The structure as recited in claim 5 wherein said reservoir is eccentric about said axis which is generally perpendicular to said bore axis.

7. A master cylinder comprising: a body member having a longitudinal bore with fluid actuating means therein, a reservoir member having a bottom surface, said reservoir having an annular male boss extending downwardly away therefrom, said body member having a female boss extending in a direction away therefrom and receiving said male boss therein, means securing said bosses together, the axis of said bosses extending in a direction generally perpendicular to the axis of said bore, said securing means allowing substantial rotation of said reservoir relative to said body member about the axis of said bosses, a rib integral with and extending outwards from the outer surface of said boss on said body member, a pair of spaced abutment surfaces integral with and projecting downwards from said bottom of said reservoir receiving said rib therebetween for engagement therewith, whereby said reservoir is prevented from substantially rotating about said axis of said bosses.

8. The structure as recited in claim 7 wherein said reservoir is eccentric about the axis of said bosses.

9. A master cylinder comprising: a body member having a longitudinal bore with fluid actuating means therein, a reservoir member having a bottom surface, said reservoir having an annular male boss extending downwardly away therefrom, said body member having a female boss extending in a direction away therefrom and receiving said male boss therein, means securing said bosses together, the axis of said bosses extending in a direction generally perpendicular to the axis of said bore, said securing means allowing substantial rotation of said reservoir relative to said body member about the axis of said bosses, a rib integral with and extending downwards from said bottom surface of said reservoir, a pair of spaced abutments integral with said male boss receiving said rib therebetween for engagement therewith, whereby said reservoir is prevented from substantially rotating about said axis of said boses.

10. The structure as recited in claim 9 wherein said reservoir is eccentric about the axis of said bosses.

References Cited by the Examiner

UNITED STATES PATENTS

| | | | |
|---|---|---|---|
| 2,386,562 | 10/1945 | Mahoney | 285—330 X |
| 2,455,544 | 12/1948 | Yonkers | 285—330 X |
| 2,687,831 | 8/1954 | Miller. | |
| 2,755,629 | 7/1956 | Baisch | 60—54.6 |
| 2,832,130 | 4/1958 | Harvey | 235—330 X |
| 2,902,298 | 9/1959 | Kolthoff | 285—321 X |
| 3,059,671 | 10/1962 | Kings | 60—54.6 X |
| 3,131,953 | 5/1964 | Windsor | 285—189 |
| 3,159,412 | 12/1964 | Descarries | 285—330 X |

FOREIGN PATENTS 1,196,173    5/1959    France.

References Cited by the Applicant

FOREIGN PATENTS 1,775,445    9/1958    Germany.

SAMUEL LEVINE, *Primary Examiner.*

ROBERT R. BUNEVICH, *Examiner.*